Figure 1:
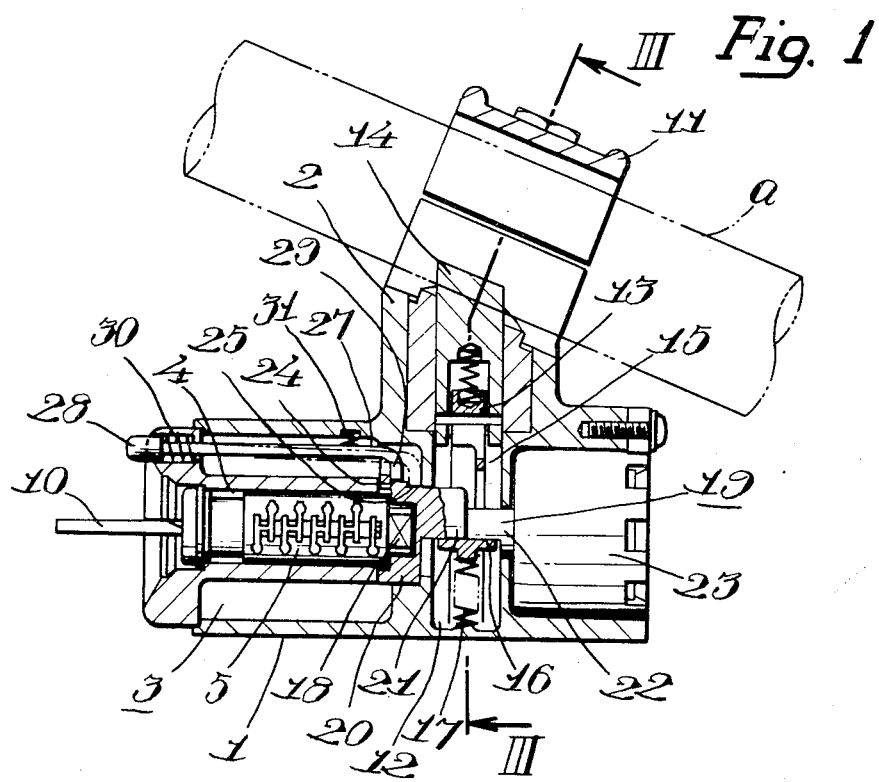

United States Patent

Mizuno

[15] 3,673,829
[45] July 4, 1972

[54] THEFT PREVENTING DEVICES IN MOTOR VEHICLES

[72] Inventor: Tadasi Mizuno, Nagoya, Japan

[73] Assignee: Kabushiki-Kaisha Tokai Rika Denki Seisakusho, Nishi-Kasugai-gun, Aichi-ken, Japan

[22] Filed: Nov. 25, 1970

[21] Appl. No.: 92,764

[30] Foreign Application Priority Data

Dec. 6, 1969  Japan..............................44/98016

[52] U.S. Cl............................................................70/252
[51] Int. Cl.......................................................B60r 25/02
[58] Field of Search...................70/239, 241, 243, 248, 250, 70/252, 254, 255, 257

[56] References Cited

UNITED STATES PATENTS 1,945,527   2/1934   Gilpin.....................................70/252

Primary Examiner—Albert G. Craig, Jr.
Attorney—Shlesinger, Fitzsimmons & Shlesinger

[57] ABSTRACT

An improvement in theft preventing devices having a rotor lock of the cylinder type by means of which the ignition circuit of a vehicle is settable to various positions including a lock and drive position, and a locking bolt which is protrusible by the rotation of rotor to the lock position to block a vital part of vehicle, in which the improvement lies in that said rotor is not rotatable to the lock position when the rotor is once rotated from the lock position unless a latch means acting on the rotor is manipulated, whereby the accidental locking of the vital part of vehicle during the driving of the vehicle is positively prevented.

3 Claims, 7 Drawing Figures

INVENTOR.
Tadasi Mizuno (A)　　　(B)　　　(C)

THEFT PREVENTING DEVICES IN MOTOR VEHICLES

This invention relates to an improvement in theft preventing devices in motor vehicles, and more particularly to an improvement in theft preventing devices by means of which the electric circuit of a motor vehicle is settable, with the rotation of a rotor, to various positions, such as a lock position wherein the locking mechanism of the device is rendered active and the ignition circuit is made open, an accessory position wherein the locking mechanism is rendered inactive and the ignition circuit is interrupted but the accessory circuit is closed, a drive or on-position wherein the locking mechanism is rendered inactive and the ignition circuit is closed, and a start position wherein the locking mechanism is rendered inactive, the starter relay is supplied with current and the ignition circuit is closed, and a locking bolt is protrusible only by the rotation of the rotor to said lock position so as to block a vital lockable part of the motor vehicle such as a steering shaft, brakes or transmission. Theft preventing devices in motor vehicles of the kind mentioned above are of two kinds, viz., the one in which a locking bolt is brought to locking engagement with the vital part of vehicle simultaneously with the rotation of a rotor to its lock position, and the other one in which the locking bolt is protrusible with the rotation of rotor to said lock position providing that the succeeding withdrawal of a key inserted into the rotor is effected.

The improvement accomplished by the present invention is directed to theft preventing devices of the kind mentioned first in the above, and consists in that a rotor, which has been rotated from its lock position to a position other than said lock position, or controlling means which moves in cooperation with the rotor for controlling the projection of a locking bolt, can not be rotated to the lock position because of latch means, which is automatically rendered active upon the rotation of rotor from the lock position, and prevents the rotor or means cooperating therewith to be set in positions other than the lock position only when the latch means is manually released.

It is, therefore, an object of the present invention to provide an improved theft preventing device in a motor vehicle, in which accidental rotation of a rotor to its stop or lock position, which renders a locking bolt active for locking engagement with a vital lockable part of the vehicle and which would bring about a traffic accident if such occurs during the running of vehicle, is positively prevented.

Figure 2:
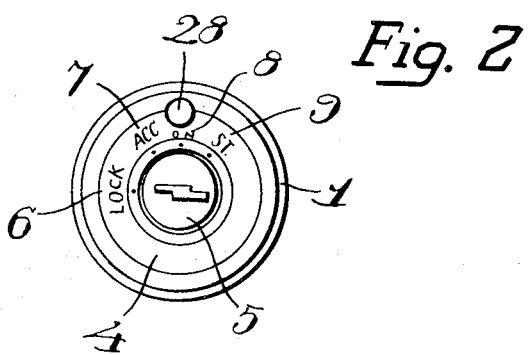
Figure 3:
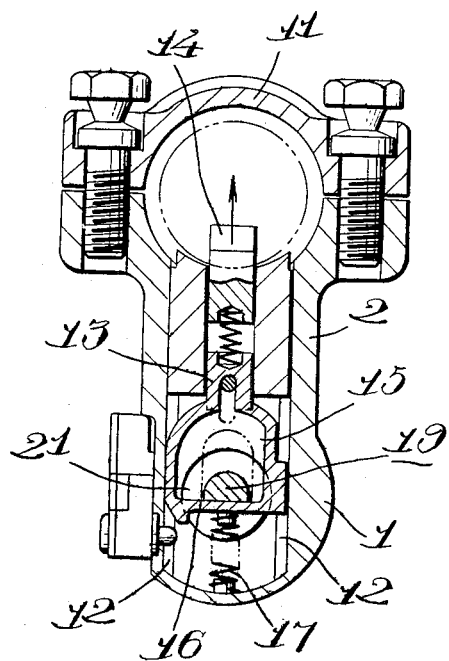
Figure 4:
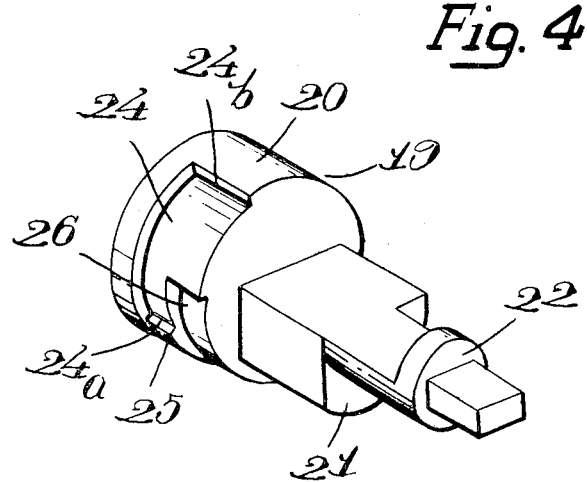
Figure 5:
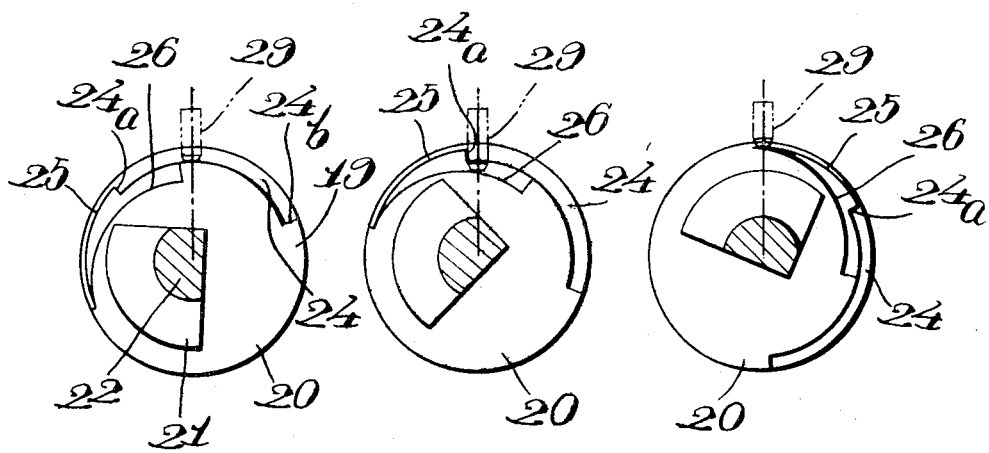

Other objects and structural detail of the invention will become apparent from the following description when read in conjunction with the accompanying drawing forming a part of the present specification, wherein:

FIG. 1 is an explanatory side sectional view of an embodiment of theft preventing device embodying the present invention, FIG. 2 is a partial front view of the theft preventing device shown in FIG. 1, FIG. 3 is a sectional view of the device, taken along the line III– III in FIG. 1, FIG. 4 is an enlarged perspective view of the controlling means which cooperates with a rotor and coacts with latch means to limit the accidental rotation of rotor, and FIG. 5 (A), (B), and (C) are explanatory views showing, respectively in connection with the controlling means, working positions of the latch means.

Referring now to the drawing, a housing 1 of a theft preventing device has a branch housing 2 which extends from the housing 1 transversely thereto so as to embrace at its forward end a steering shaft *a* of a motor vehicle. Numeral 3 indicates generally a lock of the cylinder type which is insertedly fitted in the end opening of the housing 1, and which comprises a fixed cylinder housing 4 and a rotor 5 insertedly fitted to said housing 4 so as to be rotatable by a key 10. Said rotor is settable, as illustrated in FIG. 2, to either the aforementioned lock position 6, accessory position 7, on- or drive position 8 and start position 9, and the key 10 can be inserted into and withdrawn from said rotor only at the lock position thereof. On the forward end of the branch housing 2, there is provided, as best shown in FIG. 3, a holder or clamp 11 which is fitted by screws to said branch housing so as to rigidly connect, in cooperation with said forward end of the branch housing, said housing 2 to a steering column of steering shaft *a*. A locking bolt 13 having a forward end 14 which is engageable with the shaft *a* for making locking engagement therewith with the movement of the bolt 13 into a protruded position, is accommodated in the housing 1 slidably in the transverse direction thereof and is also slidable through the branch housing 2 in the axial direction thereof, being guided by a pair of grooves 12 and 12 provided to the housing 1 in parallel with the branch housing 2. Said locking bolt 13 is provided, at its rear end which moves within the housing 1 transversely thereto, with a slot 15 having a linear end surface 16, and is urged by a spring 17 towards the steering shaft *a*, as indicated by an arrow in FIG. 3.

To the inner end of rotor 5, there is connected, by a four-sided extension 18 provided on said end, a controlling member 19 which has a specific configuration as best shown in FIG. 4 and is movable integrally with the rotor. Said controlling member comprises a cylindrical body portion 20 located adjacent the rotor, a cylindrical head portion 22 of a reduced diameter which is located remote from the rotor and adjacent a switch 23 and connected to a movable contact (not shown) of said switch for setting the electric circuit of the motor vehicle in various positions in response to the rotation of the rotor, and a neck portion 21 located between said cylindrical body portion and cylindrical head portion and provided at one thereof with a flat surface extending substantially parallel to the axes of the cylindrical body and head portions 20 and 22 and at its opposite side with a semicircular cam face. Said neck portion 21 engages with the locking bolt in slot 15.

In the theft preventing device of the above construction, when the rotor 5 is rotated to the lock position 6, the flat surface of neck portion 21 of controlling member 19 contacts the linear end surface 16 of slot 15 of locking bolt, as illustrated in FIGS. 1 and 3, resulting in allowing the locking bolt 13 to move to protruded position by the resiliency of spring 17, effecting locking engagement between the forward end 14 of the locking bolt and the steering shaft *a*, and making it impossible to manipulate said shaft. On the other hand, when the rotor is rotated clockwise to a certain angular distance between the accessory position 7 and drive position 9, the locking bolt 13 is pressed, against the spring 17, being engaged at its linear end surface 16 with the semicircular cam face of neck portion 21 of controlling member 19, whereby the forward end 14 of locking bolt is retracted into the branch housing 2 and said end is disengaged from the steering shaft *a*. The theft preventing device having the above construction and function is an example of conventional devices of the kind, and it is to be noted that the present invention improvement, detailed construction of which will fully be explained hereinunder, is not only applicable to the specific theft preventing device explained above with reference to the accompanying drawing, but also employable in other conventional devices of the kind.

Said improvement comprises specific configurations which are provided to the rotor 5 or the controlling member 19 and work to prevent the accidental locking of the theft preventing device, in cooperation with a latch means or pin 28. In the embodiment of the present invention which is illustrated in the drawing, specific configurations are provided to the cylindrical body portion 20 of the controlling member 19. To wit, there is provided on the circumferential wall of said cylindrical body portion a semicircular recess 24 with end walls 24a and 24b, the angular distances between which correspond to those from the lock position or a position between the lock position 6 and the accessory position 7, and the start position 9. In other words, when the rotor is in the lock position, the end wall 24a locates at a position substantially corresponding to the accessory position or a position between the lock position and the accessory position 7, and the other end wall 24b locates a position substantially corresponding to the start position 9. Said recess 24 further extends towards the lock position 6 so as to form a semicircular guide recess 25, which is shallower than the recess 24, and the angular distance or extension of which substantially corresponds to that between the end wall 24a of the recess 24 and the lock position. On the circumferential outer wall of cylindrical body portion 20, there is provided another guide recess 26 which connects at one of its end walls, that has a depth deeper than that of the recess 24, to said recess 24 at a position substantially corresponding to the accessory position or a position between the accessory position and the lock position. Said guide recess 26 extends towards the lock position and is gradually elevated so that its level becomes equal to that of the guide recess 25 when it reaches a position corresponding to the lock position. The aforementioned latch pin 27, which is carried by the lock housing 4 so as to be movable in its axial direction and also depressible in the direction transverse to said axial direction, has a forward end 29 which is bent inwardly towards the controlling member 19 and urged, by a spring 31 mounted between the housing 1 and the pin 27 at a position adjacent to the forward end 29 of pin 27, so as to be engageable always with one of the recesses 24, 25 and 26, and has a rear end 28 which projects outwardly from the lock housing so as to be manipulated by the fingers and is urged normally, by a spring 30 mounted between the inner end of said rear end 28 and the locking housing 4, to a protruded position, so as to make the forward end 29 normally contact with either of the recesses 25 or 24.

In the above construction, when the vehicle runs with the rotor 5 in the on- or drive position 8 and kept at said position, the rotor can never be rotated to the lock position either intentionally or by accident, thus preventing the accidental locking of the locking bolt with the steering shaft during the running of vehicle, since then the forward end 29 of latch pin 27 contacts the recess 24 of controlling member 20, as shown in FIG. 5 (A), and rotary movement of said controlling member towards the lock position and of the rotor 5 which moves integrally with said controlling member, is limited by the abutment of latch pin 27 with the end wall 24a of recess 24. However, when the rotor 5 is rotated back, in order to interrupt the ignition circuit for stopping the engine of of vehicle, to the accessory position 7 or to the off or garage position and when the latch pin 27 is pushed forward by pressing on its rear end 28 against the repulsive force of spring 30; the forward end 29 of pin 27, drops in the recess 26, by action of spring 31, as shown in FIG. 5 (B), allowing the rotor 5 to be rotated to the lock position. The latch pin 27 thus can act to prevent rotation of rotor 5 towards the on- or drive position 8 on account of its abutment with the edge of said guide recess 26 which is remote from the drive position and adjacent to the lock position. When the rotor 5, which has been released from retardation by the pin 27 after the above operation, is rotated to the lock position, as shown in FIG. 5 (C), the forward end 29 of latch pin 27 is guided within the recess 26 towards the latch position because the level of said recess 26 equals that of the recess 25 and it is brought to said recess 25 by the action of spring 30, whereby the rotor 5 becomes free again to be rotated towards the on- and start positions.

A preferred embodiment of the present invention has been described, but it is understood that the disclosure is only for the purpose of illustration, and that various changes and modifications can be made without departing from the scope of the invention as set forth in the appended claims.

And, furthermore, although the drawing illustrates a theft preventing device attached to the steering shaft of a motor vehicle, it should be noted that the present invention may also be used in conjunction with other vital parts of the motor vehicle, such as brakes or transmission.

What is claimed is:

1. An improvement in a theft preventing device for a motor vehicle by means of which the electric circuit of a motor vehicle is settable, with the rotation of the rotor of a lock of the cylinder type, to various positions such as lock, accessory, drive and start positions and a locking bolt is protrusible only by the rotation of the rotor to said lock position so as to block a vital lockable part of the vehicle such as a steering shaft, brakes or transmission, said improvement comprising a latch means provided on the device which is normally biased by spring means to an actuated position and is operable against said spring means to a disabled position, said latch means acting in said actuated position to prevent the rotor, which has been rotated from the lock position to other positions, being rotated back to the lock position, and acting when operated to the disabled position to allow said rotor to be rotated to the lock position, and said latch means being automatically returnable by the action of the spring means to the actuated position when the rotor has been returned to the lock position, said latch means acting to prevent the rotor from being rotated towards the drive position when it is operated to the disabled position.

2. An improvement in a theft preventing device for a motor vehicle by means of which the electric circuit of a motor vehicle is settable, with the rotation of the rotor of a lock of the cylinder type, to various positions such as lock, accessory, drive and start positions and a locking bolt is protrusible only by the rotation of the rotor to said lock position so as to block a vital lockable part of the vehicle such as a steering shaft, brakes or transmission, said improvement comprising a latch means provided on the device which is normally biased by spring means to an actuated position and is operable against said spring means to a disabled position, said latch means acting in said actuated position to prevent the rotor, which has been rotated from the lock position to other positions, being rotated back to the lock position, and acting when operated to the disabled position to allow said rotor to be rotated to the lock position, and said latch means being automatically returnable by the action of the spring means to the actuated position when the rotor has been returned to the lock position, said latch means coacting with cam means provided on the rotor, said cam means comprising a first cam face provided with first and second portions of different levels, said first portion being engageable with the latch means when said latch means is in the actuated position and the rotor is in the lock position and said second portion being engageable with the latch means for preventing rotation of the rotor towards the lock position when said latch means is in the actuated position and the rotor is rotated from the lock position, and a second cam face provided with first and second portions of different levels, said first portion of second cam face being engageable with the latch means for allowing the rotor to be rotated to the lock position when said latch means is operated to the disabled position and said second portion of second cam face guiding the latch means to return said means to the first portion of said first cam face when the rotor is rotated to the lock position.

3. An improvement in a theft preventing device for a motor vehicle by means of which the electric circuit of a motor vehicle is settable, with the rotation of the rotor of a lock of the cylinder type, to various positions such as lock, accessory, drive and start positions and a locking bolt is protrusible only by the rotation of the rotor to said lock position so as to block a vital lockable part of the vehicle such as a steering shaft, brakes or transmission, said improvement comprising a latch means provided on the device which is normally biased by spring means to an actuated position and is operable against said spring means to a disabled position, said latch means acting in said actuated position to prevent the rotor, which has been rotated from the lock position to other positions, being rotated back to the lock position, and acting when operated to the disabled position to allow said rotor to be rotated to the lock position, and said latch means being automatically returnable by the action of the spring means to the actuated position when the rotor has been returned to the lock position, said latch means coacting with cam means provided on a controlling means which moves integrally with the rotor and allows the protrusion of locking bolt only when the rotor is rotated to its lock position, said cam means comprising a first cam face provided with first and second portions of different levels, said first portion being engageable with the latch means when said means is in the actuated position and the rotor is in the lock position and said second portion being engageable with the latch means for preventing the rotation of rotor towards the lock position when said means is in the actuated position and the rotor is rotated from the lock position, and a second cam face provided with first and second portions of different levels, said first portion of second cam face being engageable with the latch means for allowing the rotor to be rotated to the lock position when said means is operated to the disabled position and the second portion of the second cam face guiding the latch means to return said latch means to the first portion of the first cam face when the rotor is rotated to the lock position.

* * * * *